United States Patent [19]

Matter

[11] 4,046,062
[45] Sept. 6, 1977

[54] METHOD OF FORMING THROUGH THE PARTITION CELL CONNECTORS FORMED BY AN EXTRUSION-FUSION TECHNIQUE

[75] Inventor: Robert C. Matter, Anderson, Ind.

[73] Assignee: General Motors Corporation, Detroit, Mich.

[21] Appl. No.: 134,442

[22] Filed: Apr. 15, 1971

Related U.S. Application Data

[63] Continuation of Ser. No. 785,698, Dec. 20, 1968, abandoned.

[51] Int. Cl.² ............................................. H01M 6/00
[52] U.S. Cl. .................................................. 29/623.1
[58] Field of Search ................... 136/134, 79, 80, 81, 136/175, 176; 174/84; 219/86; 29/623.1

[56] References Cited

U.S. PATENT DOCUMENTS

| 1,754,051 | 4/1930 | Rosenberg | 220/81 |
|---|---|---|---|
| 2,583,575 | 1/1952 | Katz | 219/86 |
| 2,889,393 | 6/1959 | Berger | 174/84 |
| 3,313,658 | 4/1967 | Sabatino et al. | 136/134 R |
| 3,336,164 | 8/1967 | Miller | 136/134 |
| 3,364,076 | 1/1968 | Buttke et al. | 136/134 R |
| 3,388,005 | 6/1968 | Hahn et al. | 136/134 R |
| 3,416,969 | 12/1968 | Halsall | 136/134 R |
| 3,476,611 | 11/1969 | Sabatino | 136/134 |
| 3,589,948 | 6/1971 | Adams | 136/176 |

FOREIGN PATENT DOCUMENTS

| 869,763 | 6/1961 | United Kingdom | 136/134 |

*Primary Examiner*—C. F. Lefevour
*Attorney, Agent, or Firm*—Lawrence B. Plant

[57] ABSTRACT

A method of forming a through-the-partition intercell connection between adjacent cell groups in a battery. Plate strap lugs are positioned on either side of an aperture in a partition between adjacent cells. The lugs are pressed tightly against the partition walls by opposing hold-down sleeves. Opposing extruder-electrodes move axially through the hold-down sleeves and extrude portions of each lug into the aperture. The aperture acts as an extrusion die. When extrusions contact one another inside the aperture, current is caused to flow through the extruder-electrode. The tips of the extrusions fuse and the balance softens. Extrusion of the soft material continues until the aperture is filled.

4 Claims, 6 Drawing Figures

INVENTORS
Robert C. Matter, &
BY Donald K. Aldred
Lawrence B. Plant
ATTORNEY

METHOD OF FORMING THROUGH THE PARTITION CELL CONNECTORS FORMED BY AN EXTRUSION-FUSION TECHNIQUE

This is a continuation of application Ser. No. 785,698, filed Dec. 20, 1968, in the names of R. C. Matter et al and assigned to the assignee of this application which earlier application is now abandoned.

This invention relates generally to electric storage batteries in which cell groups are interconnected, one with the other, through an aperture in a partition in a battery case. The partitions separate the respective cells. More specifically, this invention relates to an improved method for the electrical fusion and forming of such connectors using an extrusion and resistance melting technique. The improved method has a high degree of reliability and is particularly well adapted to high volume production lines.

Through-the-partition connections have been used for several years as a means for reducing the IR drop within the battery and reducing the cost of materials (e.g., lead). Of the many proposals, only three have ever become a commercial reality. These three are disclosed in Doyle et al. U.S. Pat. No. 2,942,055, Miller; U.S. Pat. No. 3,336,164 and Sabatino et al. U.S. Pat. No. 3,313,658. Doyle and Miller involve mechanically upsetting a connector member which extends through the aperture in the partition. In Doyle this member is a discrete connector pin which is upset into sealing engagement with the aperture and subsequently fused to plate strap lugs. In Miller, the connector is a male projection integral with one of the plate strap lugs which extends through the aperture and mates with a female member formed in the plate strap lug of the next adjacent cell group. The male member is mechanically upset into locking-sealing engagement with the female member and the partition wall. Sabatino et al. relates to a through-the-partition connection formed by an electrical resistance welding technique in which a connector-projection, discrete or integral, is fused by resistance welding to either the sealing faces of the plate strap lugs or another projection. In the latter variation, connector projections are formed on opposing plate strap lugs are positioned in contact with each other inside the aperture during the time when the cell groups are placed in their respective cells. Pressure is applied to the lugs and current caused to flow through the connector-projections. When the connector-projections soften and fuse, the lugs move together into sealing engagement with the partition. Concurrently, the softened connector-projections are deformed to fill the aperture.

While the Doyle method readily lends itself to a high volume production line, it requires several distinct operational steps and as well as complex equipment to carry out those steps. Our invention offers an extremely simple technique for forming reliable connections which technique not only involves fewer operational steps than Doyle but also uses much simpler equipment. Miller and Sabatino also apparently provide commercially acceptable connections. However, the preformed connector-projections tend to "hang up" on the partition at the time when the plate groups are placed in their respective cells. In comparatively low-volume production lines, more time can be spent and care given to maneuvering and more accurately placing and aligning the respective cell groups. On high-volume production lines the use of preformed projections is undesirable. Increased rejection rates are caused by improper placement of the cell groups within their respective cells and nonalignment or misalignment of the preformed projections with the aperture or mating projection or receptacle. Since there are no preformed projections on our lugs, there is never a "hang up" or misalignment problem. Likewise, since there are no preformed projection, there is no need for a "loose fit" of the cell groups within the cells to accommodate the aligning movements of the groups during their positioning. Further, the casting of the plate strap lugs with integral preformed projections normally involves the use of more complicated mold systems than is required for plate strap lugs without such connector-projections such as are used in our method. Accordingly, our process is most particularly adaptable for the formation of through-the-partition connections in high-volume production lines. Our invention is most particularly useful in conjunction with the formation of through-the-partition connections in thinwall plastic and hard rubber battery cases wherein the compressive strength of the material surrounding the aperture forms an acceptable extrusion die.

It is an object of this invention to provide an improved method for forming a through-the-partition connection in a battery by an extrusion-fusion technique which simplifies the connector formation step, and produces highly reliable connections under conditions of high-volume production.

This and other objects and benefits of this invention will become more apparent from the detailed description which follows.

Briefly stated, this invention is an extrusion-fusion technique for producing a resistance welded through-the-partition connection in electrical storage batteries, particularly lead-acid storage batteries. The method involves the basic steps of (1) press (2) extrude (3) fuse-extrude (4) hold, and (5) release. Plate straps are provided with upstanding lugs which are aligned opposite one another on either side of an aperture in a battery cell partition. A pair of opposing hold-down sleeves clamp the lugs into sealing engagement with that portion of the partition which surrounds the aperture. A pair of extruder-electrodes slide axially inside the sleeves and, under imposed pressure, extrude portions of each lug toward one another until they meet within the aperture and further extrusion ceases. Current is caused to flow between the electrodes and through the extrusions. The heat generated causes fusion of the interface between the two extrusions and softening of the metal thereabout. Upon softening of the metal and under the same imposed pressure, further extrusion of the metal results until the extrusions fill the aperture, are in liquid-tight, sealing engagement with the wall defining the aperture, and are fused together. Only one lug need have an extruded portion but it has been found that extrusions on both lugs consistently produce sounder connections. The current is shut off and the connector allowed to cool.

Figure 1:
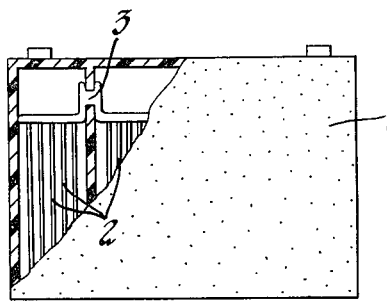
FIG. 1 is a front elevational view of a battery made in accordance with this invention.

In the drawings like numbers are used for like parts. FIG. 1 depicts a battery 1 having a number of cell groups 2 therein. The cell groups 2 are electrically series interconnected by means of the through-the-partition connection 3 which connects the positive plates of one group to the negative plates of the next adjacent group. In the process of making the battery 1, the individual plates and separators are stacked into cell groups 2 and plate straps attached thereto in a conventional manner and such that each cell group can effectively thereafter be handled as a unitized package. The thus unitized cell group is placed in the cells of the battery 1 and the process of forming the through-the-partition connection begins.

Figure 2:
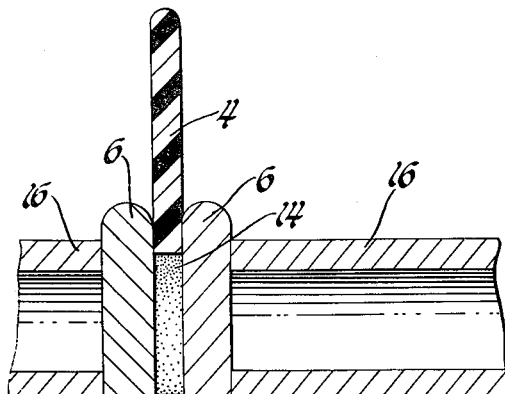
FIG. 2 is a sectioned elevational view of the first major step of this invention and shows a partition with plate strap lugs pressed against it on either side of an aperture therethrough.
Figure 4:
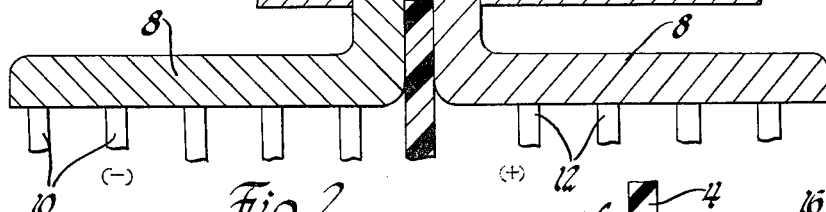
FIG. 4 is a partially sectioned elevational view of the third major step of this invention and shows the extruded portions fused together and further extruded to fill the aperture.
Figure 4:
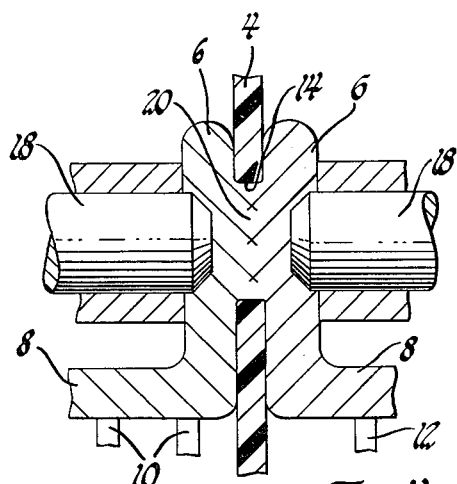
Figure 3:
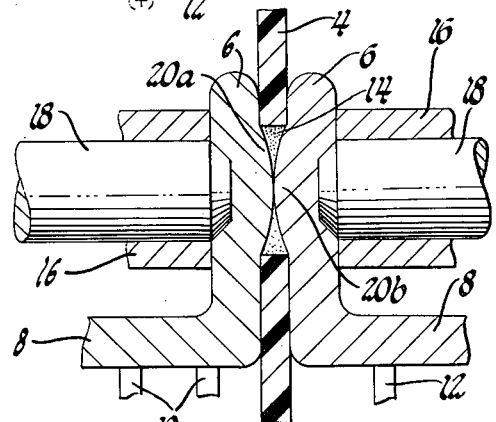
FIG. 3 is a partially sectioned elevational view of the second major step of this invention and shows the plate strap lugs having portions thereof extruded into the aperture and meeting therein.

FIGS. 2, 3 and 4 generally depict the three basic steps of our process. FIG. 2 shows, in exploded section, the first step of the process which begins after the cell group have been placed in their respective cells. A partition 4 separates one cell from the next and has an aperture 14 therein. Plate straps 8 for the respective groups have already been attached to the positive and negative grid lugs 12 and 10 respectively. The plate straps 8 have upstanding lug portions 6 which are positioned, opposing each other, on either side of the aperture 14 when the cell groups 2 are placed in the battery. To begin the through-the-partition connection forming process a pair of opposing hold-down sleeves 16 engage the upstanding lugs 6 and press them together into sealing engagement with the partition 4. While still pressed into sealing engagement with the partition 4 and, as best shown in FIG. 3, opposing extruder-electrodes 18, under the influence of a constant applied pressure, slide axially through the center of the hold-down sleeves 16 and extrude portions of the lugs 6 into the aperture 14. These portions or extrusions 20a and 20b come together inside the aperture and further extrusion ceases. Electrical current is next caused to flow between the electrodes 18 and through the extrusions 20a and 20b. This initially causes a melting and fusion of the extrusions 20a and 20b at their point of contact. As shown in FIG. 4, the heat developed softens the extrusions 20a and 20b and causes the extruder-electrodes 18, which are still under the influence of the same constant pressure, to further extrude more material into the aperture 14. The additional material fuses and the connector 20 is thus formed. In its preferred form, the extruder-electrodes 18 each have mechanical stops thereon (not shown) to insure that they do not extrude too much of the heat softened extrusions, 20a and 20b, and preclude squirting of molten lug material out of the aperture 14. However, by relying solely on hydraulic pressure buildup in the aperture, the process may be practiced without the use of stops. Regardless, when the stops have been reached and the aperture 14 filled, the current is shut off and the connector allowed to cool momentarily while still under the influence of the pressure applied to extruder-electrodes 18 and the hold-down sleeves 16. When sufficient cooling has occurred to insure the strength and liquid tightness of the connector the extruder-electrodes 18 and sleeves 16 are removed and the battery moved on to the next station for further processing.

Figure 5:
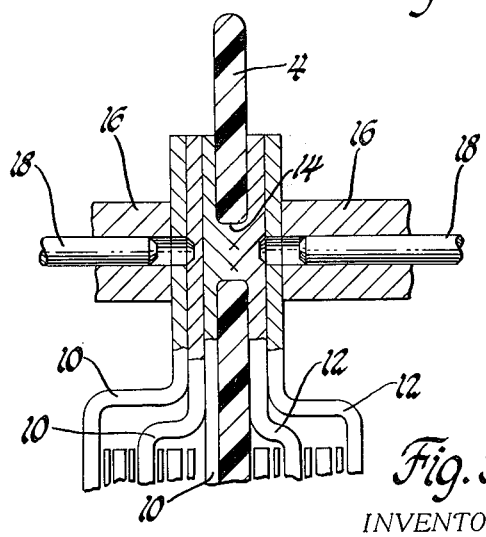

FIG. 5 shows another embodiment of the process of our invention. In this embodiment the plate strap and lug are eliminated and a number of individual grid lugs 10 and 12 are bonded together, extruded into the aperture and fused in the manner disclosed above.

Figure 6:
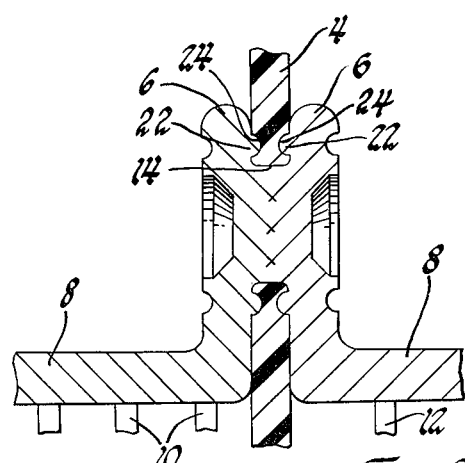
FIGS. 5 and 6 are sectioned elevational views showing other embodiments of connections which can be made in accordance with this invention.

FIG. 6 discloses a still further embodiment of our invention. In this embodiment, an additional sealing ring 22 is provided in the lug 6. A seat 24 for the ring is provided in the partition 4. The sealing ring 22 and seat 24 therefor may be formed concurrently during the extrusion step using an appropriately shaped tool (i.e., extruder-electrode or hold-down sleeve). In the alternative, the seat 24 may initially be formed in the partition at the time the aperture is punched therein. The sealing ring 22 can then either be preformed in the lug 6 at the time of casting or extruded into the preformed seat at the time of the formation of the connection through the partition — the latter being preferred since it requires simpler plate strap molds, and precludes "hang-up" and alignment problems which tend to occur when there are projections on the lugs.

In one particular application of this invention, the cell partition 4 is comprised of the homopolymer, polypropylene, or more preferably a propylene-ethylene copolymer which possesses superior impact strengths. The partition has a thickness of 0.075 inch. The aperture 14 has a diameter of about 0.433 inch and is punched through the partition. The plate strap lugs 6 are 0.29 inch thick and are comprised of 96.5% lead, 0.5% arsenic, and 3.0% antimony. Hold-down sleeves 16 have inside diameters of 0.406 inch and are caused to press the lugs against the partition under a pressure of about 250 lbs. Extruder-electrodes 18 have an outside diameter of 0.328 inch and are caused to extrude the lugs under an imposed pressure of 1200 lbs. At the pressure, the initial extrusion step requires about 2 secs. to complete. While still under the pressure, about 5,500 to 6,000 amps. are caused to flow through extrusions for about 1/6 second and at a voltage of between about 8.0 to 9.0. After the abutting extrusions have fused, the assembly is held for about a half a second to rigidize the connection sufficiently to insure maintenance of the seal and electrical connection thus formed.

While our invention has been described solely in terms of certain specific embodiments thereof, we do not intend to be limited thereto but rather only to the extent defined hereafter.

We claim:

1. A method of making substantially liquid-tight intercell connections for lead-acid storage batteries of the type having (a) nonconductive partitions dividing the case of the battery into compartments, (b) apertures in the partitions connecting adjacent compartments, (c) cell groups in the compartments, (d) a plate connector strap on each cell group, and (e) upstanding lead or lead alloy lugs on the connector straps with the lugs facing each other on each side of the apertures, the lugs being thicker than a said partition and having face portions on their face sides adapted to fully engage the immediate surface areas of the partitions around the apertures and joint-forming portions circumscribed by said face portions and adapted by fusion to link one lug to the other through the apertures, said method comprising the steps of:

positioning the cell groups with their associated straps in the compartments so that the lugs of the straps overlay the apertures of the partitions with the face portions adjacent the immediate surface area around the apertures;

positioning tool means on the back sides of the lugs, the tool means for each lug including a clamp portion, a bore in the clamp portion and a conductive plunger movable in the bore, the bores and plungers for opposing lugs being aligned with a substantial area of their associated aperture;

actuating the tool means to cause the clamp portions to engage the lugs with a sufficient clamping force to seal off the apertures with the face portions of the lugs, the joint-forming portions being spaced from each other midway through the apertures and with the partitions defining apertures which are substantially free of lug material; while maintaining the clamping force, squeezing the plungers with sufficient plunger pressure to cause the plungers to sink into the back sides of the lugs to a depth less than their thickness and short of the mouths of the apertures to extrude lead or lead alloy from the joint-forming portions of the lugs into the apertures to bridge the space therein and make contact between the lug extrusions approximately midway through the apertures;

while maintaining the pressure on the plungers and the force on the clamp portions, passing electrical current through the plungers and lug extrusions to fuse the lead or lead alloy in the apertures and to extrude more of the lugs into the apertures until voids therein fill completely with only fused lead or lead alloy which is forced out of the lugs, and, at the same time, seal against the leakage of fused lead or lead alloy from the apertures by the forcible engagement of the face portions of the lugs with the immediate surface areas around the apertures;

deenergizing the electrical current while continuing to maintain the clamping force and plunger pressure to keep the apertures filled during the solidification and cooling of the fused lead or lead alloy in the apertures into weld nuggets, whereby the cell groups are electrically joined by the lugs by liquid-tight, through-the-partition connections that were formed by the solidification of the weld nuggets under pressure.

2. A method of connecting battery plate units of adjacent cells through an aperture in a partition between adjacent cell chambers comprising the steps of: assembling individual plate units for each adjacent cell and placing the units in the cell chambers of a battery case, the battery case having a partition between adjacent cells and the partition having an aperture, said plate units having projections from the battery straps thereof formed with substantially flat surfaces adapted to fit over and lie against the partition surrounding the aperture; placing a pair of electrodes against the projections from the battery straps on each side of the partition in substantial alignment with the aperture therein; applying sufficient force to the electrodes to cause them to move relatively toward each other to deform portions of the projections into contact with each other within the aperture; after said contact is made applying sufficient electric current thereto to fuse the deformed portions of the projections together within the aperture, and concurrently therewith applying sufficient force to said electrodes to deform sufficiently more of the projections into the aperture to fill the aperture with projections material and maintain it under pressure therein; clamping said flat surfaces of said projections against opposite sides of said partition sufficiently to provide a liquid seal surrounding the aperture during and following said filling; and discontinuing said current application while maintainin said force application during cooling, whereby said fused and pressurized material is confined to said aperture during said filling and a liquidtight seal is effected both within and surrounding the aperture upon cooling and removal of the electrodes.

3. A method of making substantially liquid-tight intercell connections for lead-acid storage batteries of the type having (a) at least one nonconductive partition dividing the case of the battery into compartments, (b) an aperture in the partition connecting adjacent compartments, (c) cell groups in the compartments, (d) a plate connector strap on each cell group, and (e) upstanding lead or lead alloy lugs on the connector straps with the lugs facing each other on each side of the aperture, the lugs being thicker than a said partition and having face portions on their facing sides adapted to engage the immediate surface areas of the partitions around the apertures and joint-forming portions circumscribed by said face portions and adapted by fusion to link one lug to the other through the apertures, said method comprising the steps of:

positioning the cell groups with their associated straps in the compartments so that the straps' lugs overlay the aperture such that the face portions of the lugs are adjacent the immediate surface area around the aperture and the joint-forming portions are spaced from each other across a substantial portion of the aperture;

positioning tool means on the back sides of the lugs and in substantial axial alignment with the aperture between said lugs, said tool means including means for extruding said joint-forming portions from said lugs into the aperture therebetween prior to and during subsequent welding, and means for pressing said face portions tightly against said surface areas of the partition surrounding the aperture to seal off the aperture with said face portions during and following welding;

actuating said tool means with sufficient force to sink said extruding means into the back sides of the lugs to a depth less than their thickness and short of the mouths of the aperture to cold extrude lead or lead alloy from the joint-forming portions of the lugs into the aperture to bridge the space therein and make contact between the lug extrusions approximately midway through the aperture;

containing to apply force to said tool means while passing electrical current through the lug extrusions to fuse the lead or lead alloy in the aperture and to fill the aperture with additional lead or lead alloy further extruded from the lugs during current passage while at the same time preventing expulsion of lead or lead alloy from the aperture by said pressing means pressing the face portions of the lugs into sealing engagement with the immediate surface areas around the aperture;

deenergizing the electrical current while continuing to maintain the tool force to keep the aperture filled with lead or lead alloy, sealed therein and under pressure during solidification and cooling.

4. A method of connecting battery plate units of adjacent cells through an aperture in a partition between adjacent cell chambers comprising the steps of: assembling individual plate units for each adjacent cell and placing the units in the cell chambers of a battery case, the battery case having a partition between adjacent cells and the partition having an aperture, said plate units having battery straps thereon and upstanding lugs on said straps, said lugs being formed with substantially flat surfaces adapted to fit over and lie against the partition surrounding the aperture; placing a pair of electrodes against said lugs on each side of the partition in substantial alignment with the aperture therein; applying sufficient force to the electrodes to cause them to move relatively toward each other to initially cold deform portions of the lugs into contact with each other within the aperture; while applying sufficient electric current to fuse the deformed portions of the lugs and pressing said flat surfaces of said lugs into sealing engagement with the opposite sides of said partition surrounding the aperture, forcing said electrodes further together to join said portions and secondarily warm deform more of the lugs into the aperture sufficiently to fill the aperture with lug material under pressure; and discontinuing said current application while maintaining said force application during cooling, whereby said fused and pressurized material is confined to said aperture during said secondary deformation and a liquid-tight seal is effected both within and surrounding the aperture upon cooling.

* * * * *

UNITED STATES PATENT AND TRADEMARK OFFICE
CERTIFICATE OF CORRECTION

PATENT NO. : 4,046,062
DATED : September 6, 1977
INVENTOR(S) : Robert C. Matter

It is certified that error appears in the above-identified patent and that said Letters Patent are hereby corrected as shown below:

Column 2, line 60, after "extruder-electrodes" insert -- or plungers --.

Column 5, lines 66 and 67, "projections" should read -- projection --.

Column 6, line 4, "maintainin" should read -- maintaining --.

Column 6, line 50, "containing" should read -- continuing --.

*Signed and Sealed this*

*Eleventh* Day of *April 1978*

[SEAL]

Attest:

RUTH C. MASON
*Attesting Officer*

LUTRELLE F. PARKER
*Acting Commissioner of Patents and Trademarks*